United States Patent [19]

Amelio

[11] Patent Number: 5,072,898
[45] Date of Patent: Dec. 17, 1991

[54] ENGINE COWLING ROLLER ATTACHMENT

[75] Inventor: Armand F. Amelio, Yonkers, N.Y.

[73] Assignee: United Technologies Corporation, Hartford, Conn.

[21] Appl. No.: 576,571

[22] Filed: Aug. 31, 1990

[51] Int. Cl.$^5$ .............................................. B64C 1/14
[52] U.S. Cl. .................................... 244/129.4; 49/409
[58] Field of Search .................. 292/251, 43; 411/309; 244/129.4, 121, 53 R; 296/192, 216, 220; 49/409

[56] References Cited

U.S. PATENT DOCUMENTS

| | | | |
|---|---|---|---|
| 2,293,841 | 8/1942 | Long | 49/409 |
| 2,350,689 | 6/1944 | Long | 49/409 |
| 3,067,968 | 12/1962 | Heppenstall | 244/53 R |
| 4,729,707 | 3/1988 | Takahashi | 411/389 |
| 4,741,542 | 5/1988 | Kimerly | 244/121 |

Primary Examiner—Joseph F. Peters, Jr.
Assistant Examiner—Linda L. Palomar

[57] ABSTRACT

An aircraft cowling (20) is comprised of a cowling body (22), forward and aft bearings (24,25) disposed on the cowling body (22), corresponding sets of guides (29,30) disposed on and conforming with the shape of the aircraft (26), a screw fastener assembly (74), latches (82), and complementary interaction between the cowling edges (68,70) and aircraft edges (69,71) to provide lateral support for the cowling (20). The aft bearing (25) is comprised of two rollers (44) and two roller supports (46) which are disposed on the cowling body (22) in a manner permitting lateral motion and coupled by a shaft (50) with right-hand threads (56) on one end and left-hand threads (58) on the other end. The shaft (50), due to the opposing threads (56,58), restricts the roller supports (46) to convergent and divergent movements and prevents movement in a common direction, thereby providing lateral support to the cowling (20) during opening and closing.

8 Claims, 5 Drawing Sheets

FIG.2
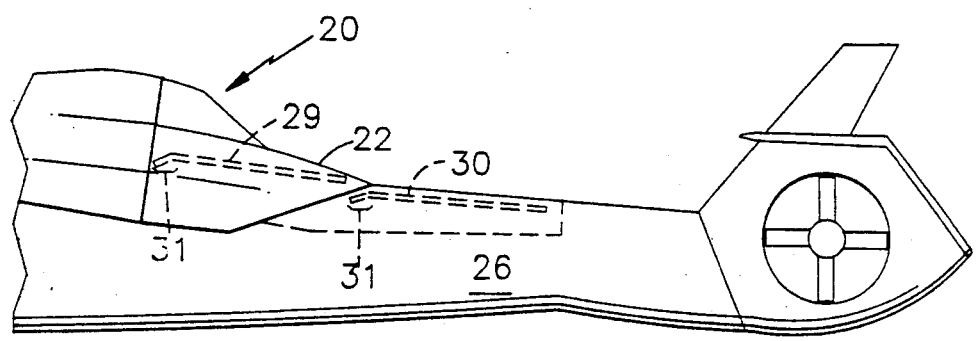
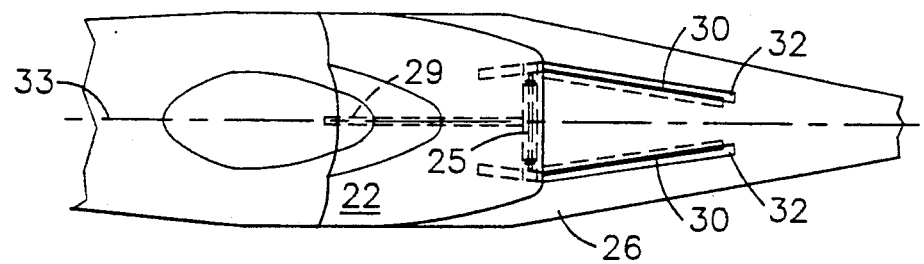
FIG.3

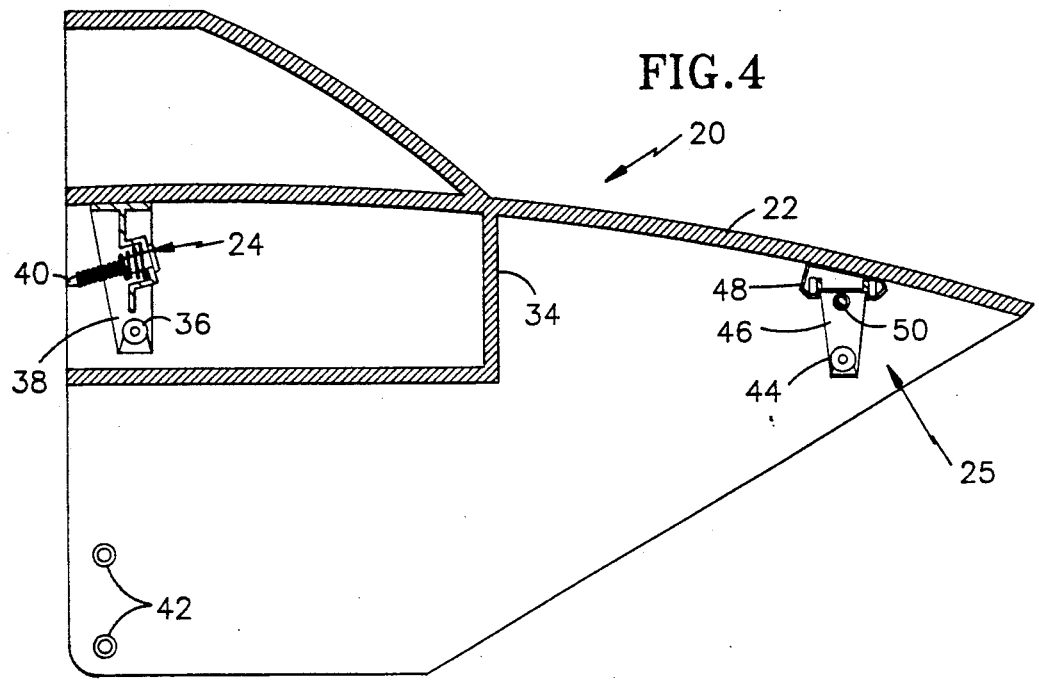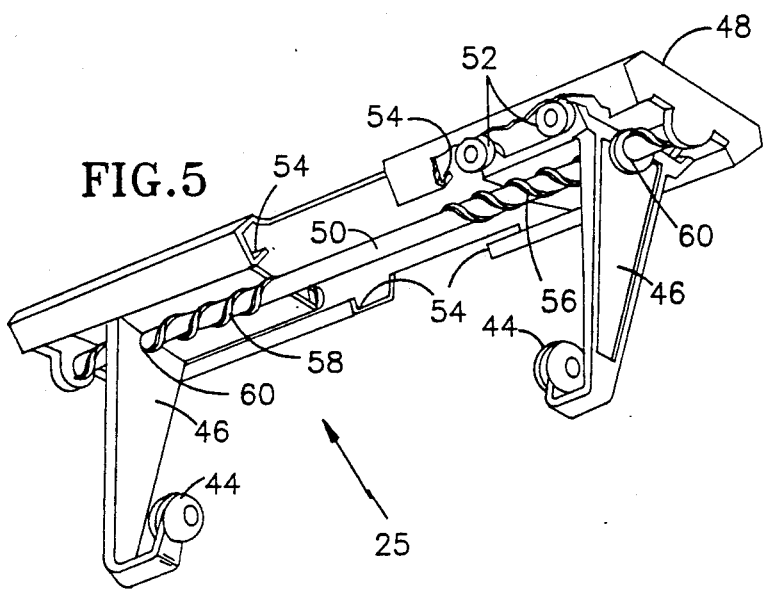

ENGINE COWLING ROLLER ATTACHMENT

The Government has rights in the invention pursuant to a contract awarded by the Department of the Army.

DESCRIPTION

1. Technical Field

This invention relates to aircraft cowlings, and more particularly to attachment mechanisms for aircraft cowlings.

2. Background Art

Cowlings provide access to and protection for internal components of an aircraft. Aerodynamic considerations typically produce a cowling with a complex shape and require an attachment mechanism capable of withstanding significant air loads. An additional requirement of many aircraft applications is to design the cowling so as not to add significantly to the detectability of the aircraft. In order to do this, discontinuities in the fuselage should be kept to a minimum and whatever detectable parts are necessary for the attachment mechanism should be concealed if possible.

A common technique of cowling attachment is to utilize a combination of hinge and latch assemblies. The drawback to this solution is that the complex shape of the cowling limits the hinges and latches to being positioned in remote locations relative to the loading on the cowling. The remote use requires the hinges and latches to be strengthened to supply the necessary reactive force and this strengthening typically adds weight, which is to be avoided for aircraft applications. Additionally, the external hinges and latches are exposed and produce discontinuities in the surface of the fuselage which are undesirable.

Another solution is to utilize a sliding mechanism to attach the cowling to the aircraft. This typically involves having the edges of the cowling slide along a guides built into the body of the aircraft. A major drawback to this solution is that the guides normally must be parallel and straight in order for the cowling to be able to slide. For aircraft applications, where aerodynamics is a concern, the complex body shapes make this solution impractical in many situations. Additionally, the guides are often exposed and are prone to jamming due to buildup of debris and ice.

DISCLOSURE OF INVENTION

An object of the invention includes the provision of a lightweight attachment mechanism for coupling two elements to permit relative motion between the elements while resisting applied loads in unison.

Another object of the invention includes the provision of a lightweight attachment mechanism for opening and closing of an aircraft cowling.

A still further object of the invention is provision of an attachment mechanism for an aircraft cowling which has minimal impact on detectability of the aircraft.

According to the present invention, an attachment mechanism for an aircraft cowling is comprised of a forward bearing and a plurality of aft bearings which are engaged by corresponding guides mounted within existing superstructure of the aircraft and coupled by a shaft having opposite handed threads on the ends such that the aft bearings are restricted to divergent or convergent movement. The relative motion of the aft bearings provides a reactive force to lateral loads during opening and closing of the cowling and permits the aft guides to be shaped to conform to the aircraft.

Further, the bearings are comprised of split spherical rollers which roll within cylindrical guides and roller supports which translate longitudinally within a slot along the underside of the guides. The position of the slot permits location of the guides under existing superstructure of the aircraft and therefore reduces the exposure of the guides. The slot also prevents the buildup of debris and ice in the guide which could degrade performance. Additionally, in the event of seizure of the rollers, the spherical shape of the rollers would enable the rollers to slide within the guides and permit removal of the cowling.

Still further, the edges of the cowling and the aircraft are shaped to provide lateral support when the cowling is closed with minimal discontinuity along the seam between the cowling and the aircraft. Additionally, a gasket type sealant is disposed along the edge of the body to seal the internal cavity.

The foregoing and other objects, features and advantages of the present invention will become more apparent in light of the following detailed description of the exemplary embodiment thereof as illustrated in the accompanying drawings.

BRIEF DESCRIPTION OF DRAWINGS

FIG. 2 is a side elevation view of an aircraft body with the location of the guides indicated.

FIG. 3 is a top view of an aircraft body with the location of the guides indicated.

FIG. 4 is a sectional, side elevation view of a cowling.

FIG. 5 is a perspective view of an aft bearing.

BEST MODE FOR CARRYING OUT THE INVENTION

Figure 1:
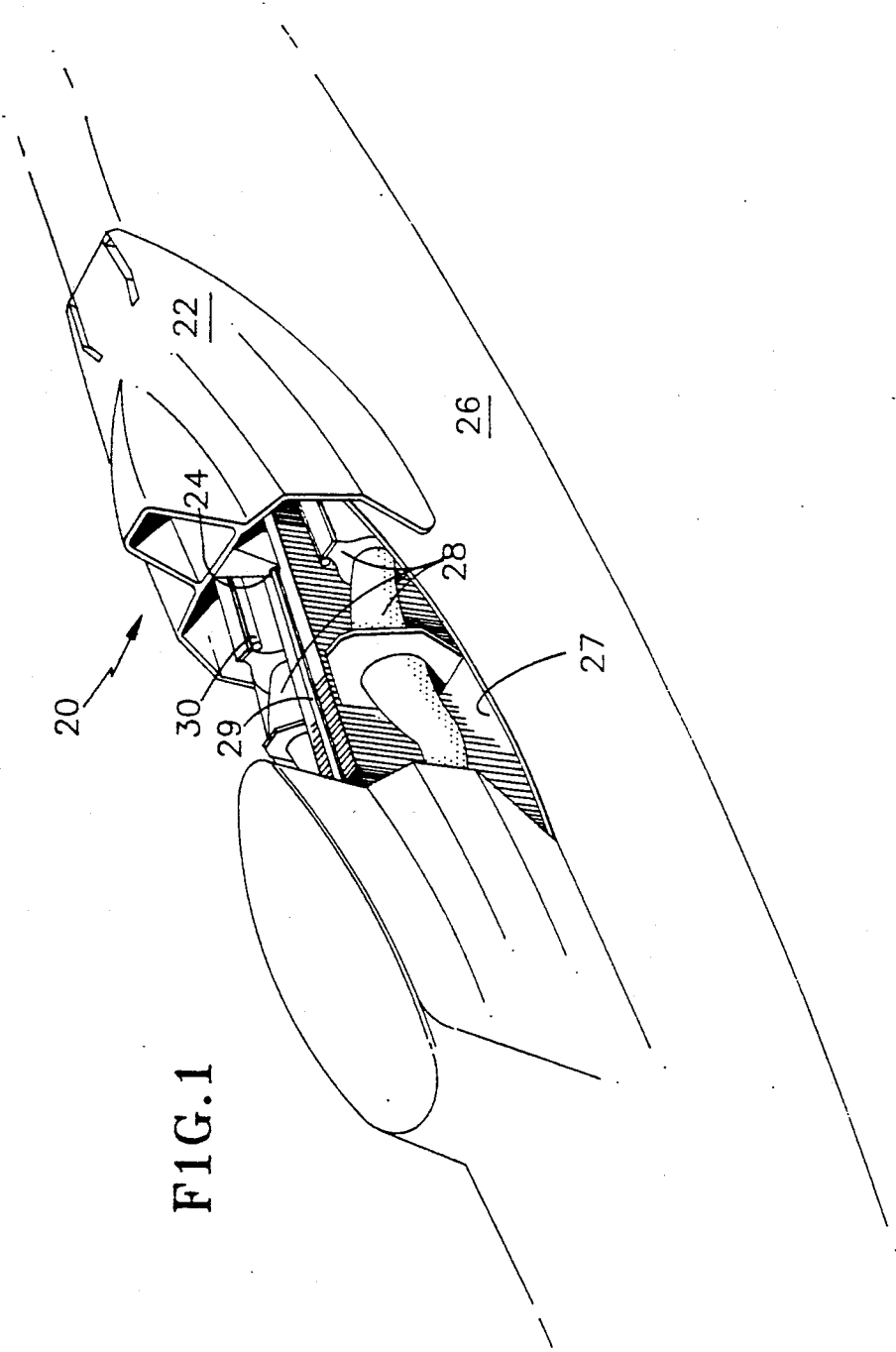
FIG. 1 is a perspective view of an aircraft body and cowling.

Referring now to FIG. 1, a cowling 20, comprised of a cowling body 22, a forward bearing 24, and an aft bearing 25 (see FIG. 4), is disposed on an aircraft 26 over a cavity 27 containing various engine components 28. A forward bearing guide 29, which engages and constrains the motion of the forward bearing 24, and two aft bearing guides 30, which engage and constrain the motion of the aft bearing 25, are rigidly disposed on the aircraft 26.

Referring to FIG. 2, the cowling body 22 is shaped to conform to the aircraft 26 when in a closed position and provides both protection and access to internal engine components 28 of the aircraft 26. Forward portions 31 of the guides 29,30 are shaped to provide an initial vertical displacement of the cowling body 22 during removal in order to supply adequate clearance between the cowling body 22 and the aircraft 26. After the initial vertical motion, the guides 29,30 constrain the cowling body 22 to motion parallel with the aircraft 26. The two aft guides 30 are rigidly fixed under secondary air intake slots 32, as shown in FIG. 3. The intake slots 32, which conform to the taper of the aircraft 26, provide access for the aft bearing 25 to the aft guides 30. Therefore the aft guides 30 are also shaped to conform to the taper of the aircraft 26 and are mirror images about the longitudinal centerline 33 of the aircraft 26.

Referring to FIG. 4, the forward bearing 24 is rigidly disposed on the cowling body 22 within existing cowling 20 superstructure 34 and is comprised of a split spherical roller 36, a roller support 38, and a threaded extension 40. The threaded extension 40 and a plurality of projections 42 disposed on the cowling body 22 are utilized as part of a fastening system for the cowling 20.

The aft bearing 25 is disposed on the aft portion of the cowling body 22 and, as shown in FIG. 5, is comprised of a pair of split spherical rollers 44, a pair of roller supports 46, a channel 48, and a shaft 50. The channel 48 provides a means to mount the roller supports 46 to the cowling body 22 in a manner restricting the roller supports 46 to lateral motion relative to the cowling body 22, such as by utilizing a plurality of cylindrical bearings 52 which are in rolling contact with tracks 54 on the channel 48 as shown in FIG. 5.

The shaft 50, which is supported by the channel 48 in a manner allowing the shaft 50 to rotate freely about the longitudinal axis of the shaft 50, has right-handed threads 56 on one end and left-handed threads 58 on the other end which engage properly threaded apertures 60 in the roller supports 46 to provide coupling of the roller supports 46. The threads 56,58, however, limit the roller supports 46 to convergent and divergent motion along the shaft 50 and resist motion in a common direction along the shaft 50. The convergent/divergent motion permits the aft guides 30 to be shaped to conform to the shape of the aircraft 26. Additionally, the resistance in motion of the aft roller supports 46 provides lateral support to the cowling body 22 during opening and closing of the cowling 20 since lateral loads will attempt to drive the roller supports 46 in a common direction.

Figure 6:
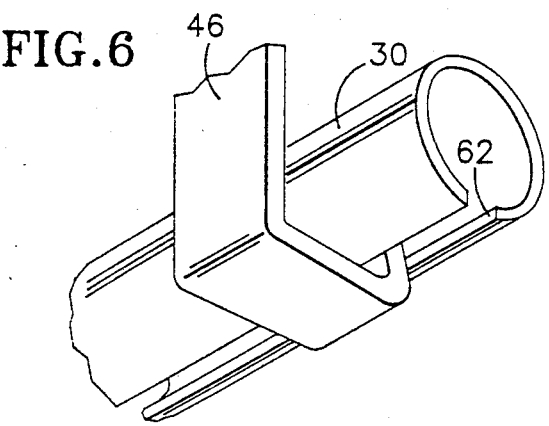
FIG. 6 is a perspective view of a guide, partially broken away and partially in section.
Figure 8:
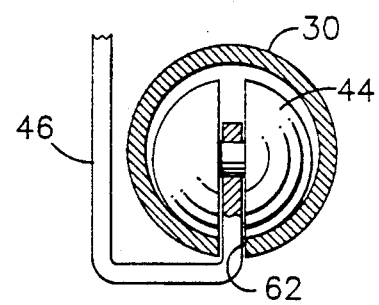
FIG. 8 is a view taken along line 8—8 of FIG. 7, partially broken away and partially in section.
Figure 7:
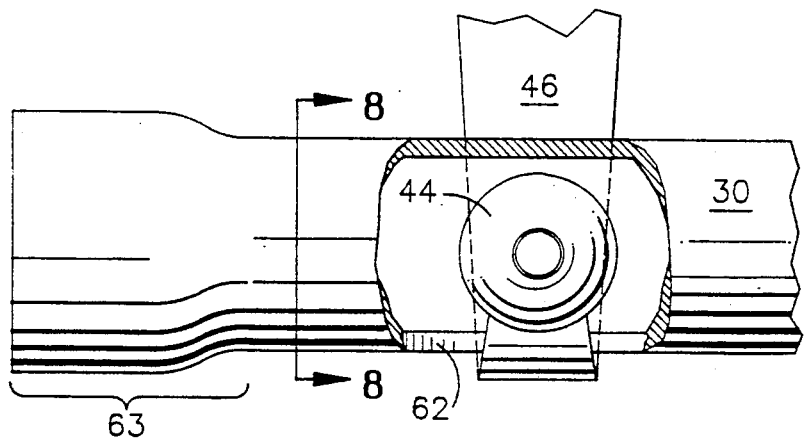
FIG. 7 is a side view of a split spherical roller and guide, partially broken away and partially in section.

The split spherical rollers 36,44 move within guides 29,30 which are cylindrical with a longitudinal slot 62 along the underside of the guides 29,30 to accommodate passage therethrough of the roller supports 36,46, as shown in FIGS. 6, 7, and 8 for an aft roller 46. The shape of the rollers 44 and guides 29,30, which is identical for both the forward roller 36 and the aft rollers 46, will permit sliding of the rollers 44 within the guides 29,30 in the event of roller 44 seizure. The slot 62, due to its location on the underside of the guides 29,30, will deter the accumulation of ice and debris in the guides 29,30 and thereby deter jamming of the rollers 44 within the guides 29,30.

The forward portions 63 of the guides 29,30 are expanded radially in order to disengage the rollers 44 from the guides 29,30 when the cowling 20 is fully closed, as shown in FIG. 7. The disengagement prevents damage to the bearings 24,25 and guides 29,30 during operation of the aircraft 26, which is when loading on the cowling 20 is highest.

Figure 9:
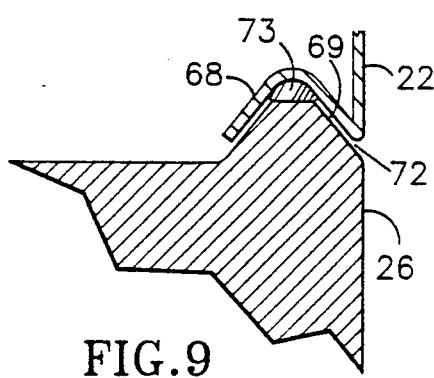
FIG. 9 is a sectional view of a side cowling seam.
Figure 10:
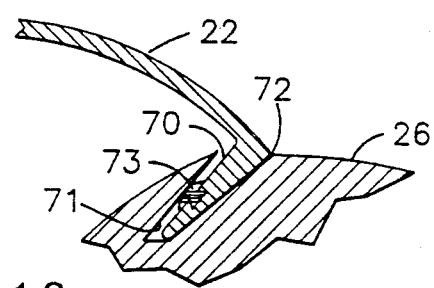
FIG. 10 is a sectional view of an aft cowling seam.

Referring to FIGS. 9 and 10, the interaction between shaped edges 68,70 on the cowling body 22 and shaped edges 69,71 of the aircraft 26 provide reactive support when the cowling 20 is in the closed position. The cowling side edge 68 and aircraft side edge 69 are complementary, as shown in FIG. 9, to provide lateral support and the cowling aft edge 70 and aircraft aft edge 71 are complementary, as indicated in FIG. 10, to provide support for vertical loads. This interaction provides for distribution of the loads rather than the concentration of loading which occurred with the prior art technique of external hinge and latch assemblies. Additionally, the discontinuity at the seam 72 between the cowling body 22 and the aircraft 26 is minimal due to the complementary mating. Sealing of the cavity 27 is provided by a gasket 73 located around the periphery of the cowling edge 68,70.

During opening operations the cowling body 22 initially slides along the aircraft side edges 69 until the rollers 44 engage the guides 29,30. After engagement of the rollers 44 and guides 29,30, clearance between the cowling side edges 68 and aircraft side edges 69 is provided by the vertical displacement of the cowling body 22 due to the shape of the forward portion 31 of the guides 29,30 (see FIG. 2).

Figure 11:
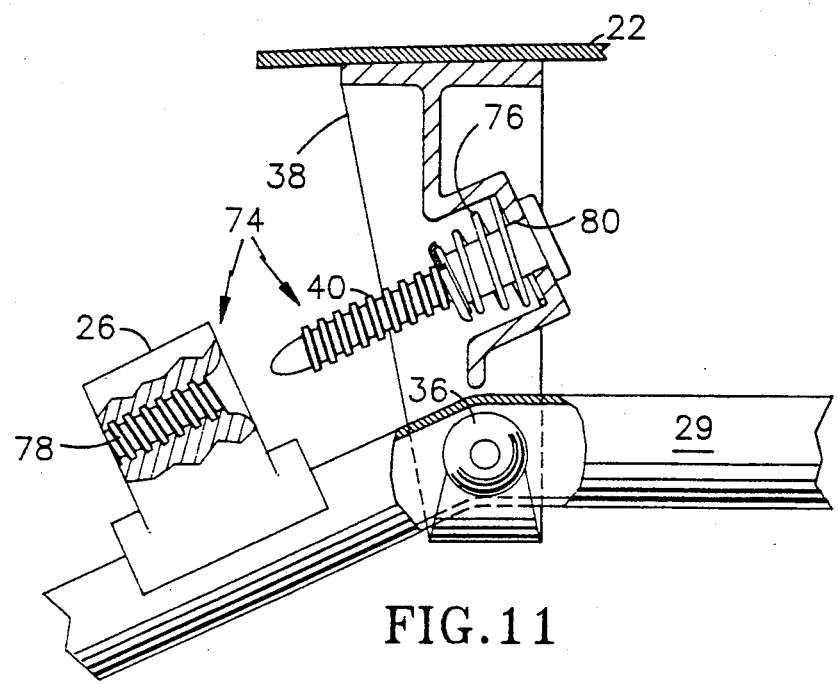
FIG. 11 is a side elevation view of a screw fastener assembly, partially in section.

A two-part fastening system is provided to secure the cowling body 22 to the aircraft 26 when closed. The first part is a screw fastener assembly 74 shown in FIG. 11 which consists of a threaded extension 40 pivotally mounted on the forward roller support 38 by use of a spring 76 and positioned to engage with a threaded socket 78 mounted on the aircraft 26. The threaded extension 40 and an aperture 80 in the roller support 38 are mutually keyed such that their interaction prevents rotation of the threaded extension 40. Engagement of the extension 40 and socket 78 occurs when the cowling body 22 is in the closed position and the securing is achieved by operation of a remotely located rotational mechanism (not shown) for rotating the socket 78. The spring 76 mounting arrangement provides an alignment mechanism, pressure to ensure thread engagement, and protection against damage due to exposure of the threaded extension 40. An alternative embodiment (not shown) of the screw fastener assembly 74 has the threaded extension disposed on the aircraft 26 in a manner permitting rotation and the socket 78 disposed on the cowling body 22.

The screw fastener assembly is also utilized during the opening and closing operations of the cowling. The screw fastener assembly provides a mechanical advantage to the operator which makes the cowling, which initially slides along the aircraft side edges until the rollers engage the guides, easier to open. The same mechanical advantage also allows the operator to tightly seal the cavity during closing operations.

Figure 12:
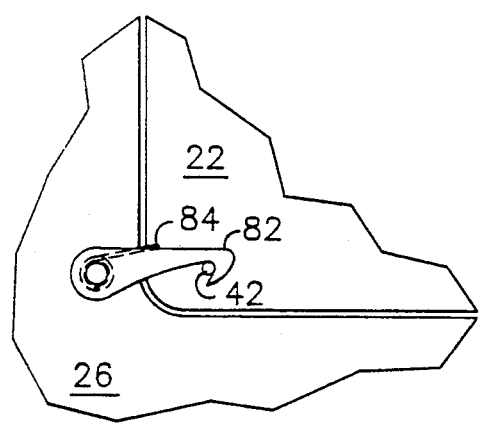
FIG. 12 is a side elevation view of a fastening latch.

The second part of the fastening system is a redundant measure provided as a safety feature in case of failure of the screw fastener assembly 74 and is illustrated in FIG. 12. A plurality of spring biased latches 82 are pivotally mounted to the aircraft 26 and positioned to engage with the projections 42 rigidly mounted on the cowling body 22 (see FIG. 4). The latches 82 are resiliently biased by respective springs 84. Engagement of the latches 82 and projections 42 occurs automatically upon closing of the cowling 20 and disengagement is achieved by operation of a remotely located release mechanism (not shown). For convenience of operation the release mechanism may be combined with the screw fastener rotary mechanism, such as by utilization of a push-pull, rotary device (not shown).

The embodiment of the invention as illustrated in FIGS. 1 to 5 shows a three point attachment mechanism for an aircraft cowling 20. It should be obvious to those skilled in the art that a modified number of attachment points may be used, such as by increasing the number of bearings or by increasing the number of attachment points associated with each bearing, without departing from the spirit and scope of the invention.

Although the invention has been shown and described with respect to exemplary embodiments thereof, it should be understood by those skilled in the art that various changes, omissions and additions may be made therein and thereto, without departing from the spirit and scope of the invention.

Having thus described a typical embodiment of the invention, that which is claimed as new and desired to secure by Letters Patent of the United States is:

1. An attachment mechanism, which joins first and second elements and permits relative motion between the elements, comprised of:
   a plurality of guides disposed on the first element;
   a plurality of bearings engaged with said guides in a manner permitting translation of said bearings along said guides;
   threaded apertures disposed in a fixed relationship to said bearings; and
   a shaft disposed on the second element in a manner permitting axial rotation of said shaft, said shaft having right-handed threads on one end, left-handed threads on the opposite end of said shaft, and at least one of said bearings disposed on each end of said shaft through threaded engagement with said apertures.

2. The attachment mechanism according to claim 1, wherein each of said guides has a longitudinal slot of sufficient lateral width which adapts said guides to permit a roller support to have longitudinal motion within said slot and said bearings are rollers disposed on said roller supports in a manner permitting rotation of said roller, said rollers being enclosed within said guide in a manner permitting rolling contact between said rollers and said guides.

3. An attachment mechanism for an aircraft and an aircraft cowling, the cowling being movable between an open and closed position and having a body shaped to conform to the aircraft when in the closed position, wherein the attachment mechanism comprises:
   a plurality of guides disposed on the aircraft;
   a plurality of bearings engaged with said guides in a manner permitting translation of said bearings along said guides;
   threaded apertures disposed in a fixed relationship to said bearings; and
   a shaft disposed on the cowling in a manner permitting axial rotation of said shaft, having right-handed threads on one end and left-handed threads on the opposite end of said shaft, and with at least one of said bearings disposed on each end of said shaft through threaded engagement with said apertures.

4. The aircraft cowling attachment mechanism according to claim 3, wherein provision is made for a fastening assembly comprised of a threaded extension, a threaded socket positioned to engage with said extension upon closing said cowling, and a means for effecting relative rotation between said extension and said socket.

5. The aircraft cowling attachment mechanism according to claim 3, wherein provision is made for a fastening assembly comprised of a threaded extension resiliently disposed on said cowling, a threaded socket disposed on the aircraft in a manner permitting rotation about the longitudinal axis of said socket and positioned to engage said extension upon closing said cowling, and a means for rotation of said socket.

6. The aircraft cowling attachment mechanism according to claim 3, wherein a cavity is defined by said cowling and the aircraft, the aircraft and said cowling each having complementary edges being shaped to provide reactive support for said cowling and including means to seal the cavity with said cowling in the closed position.

7. The aircraft cowling attachment mechanism according to claim 3, wherein said guides are cylindrical with a longitudinal slot of sufficient lateral width which adapts said guides to permit a roller support to have longitudinal motion within said slot and said bearings are split spherical rollers disposed on said roller supports in a manner permitting rotation of said split spherical roller, said rollers being enclosed within said guide in a manner permitting rolling contact between said split spherical rollers and said guides.

8. The aircraft cowling attachment mechanism according to claim 7, wherein said longitudinal slot faces in a direction which permits forces acting on debris to urge the debris out of said guide.

* * * * *